(12) United States Patent
Johnson et al.

(10) Patent No.: US 11,719,576 B2
(45) Date of Patent: Aug. 8, 2023

(54) MID-WAVE AND LONG-WAVE INFRARED POINT SPECTROMETER

(71) Applicant: California Institute of Technology, Pasadena, CA (US)

(72) Inventors: William R Johnson, Pasadena, CA (US); Matthew E Kenyon, Pasadena, CA (US); Jordana Blacksberg, La Canada, CA (US); Carol A Raymond, Pasadena, CA (US); Bethany L Ehlmann, Pasadena, CA (US); Xiangwen Chen, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 99 days.

(21) Appl. No.: 17/083,165

(22) Filed: Oct. 28, 2020

(65) Prior Publication Data

US 2021/0131872 A1    May 6, 2021

Related U.S. Application Data

(60) Provisional application No. 62/929,628, filed on Nov. 1, 2019.

(51) Int. Cl.
*G01J 3/28* (2006.01)
*G01J 3/02* (2006.01)
(Continued)

(52) U.S. Cl.
CPC .............. *G01J 3/2803* (2013.01); *B64G 1/66* (2013.01); *G01J 3/021* (2013.01); *G01J 3/0286* (2013.01);
(Continued)

(58) Field of Classification Search
CPC ........ G01J 3/2803; G01J 3/021; G01J 3/0286; G01J 3/18; G01J 5/12; G01J 2003/2813;
(Continued)

(56) References Cited

U.S. PATENT DOCUMENTS

| 3,748,015 | A | | 7/1973 | Offner | |
| 5,276,321 | A | * | 1/1994 | Chang | ..................... G01V 8/02 250/236 |

(Continued)

OTHER PUBLICATIONS

A. D. Rogers, et al., "Areally Extensive Surface Bedrock Exposures on Mars: Many Are Clastic Rocks, Not Lavas," *Geophys. Res. Lett.* 45(4), 1767-1777 (2018). 12 Pages.

(Continued)

*Primary Examiner* — Marcus H Taningco
(74) *Attorney, Agent, or Firm* — Steinfl + Bruno, LLP

(57) ABSTRACT

Methods and devices to implement mid-wave and long-wave infrared point spectrometers are disclosed. The described methods and devices involve bi-faceted gratings, high-operating-temperature barrier infrared and thermal detectors. The disclosed concept can be used to design flight spectrometers that cover broad solar reflectance plus thermal emission spectral ranges with a compact and low-cost instrument suitable for small spacecraft reconnaissance of asteroids, the Moon, and planetary satellites as well as mass-constrained landed missions.

18 Claims, 12 Drawing Sheets

(51) Int. Cl.
  *G01J 3/18* (2006.01)
  *B64G 1/66* (2006.01)
  *G02B 23/06* (2006.01)
  *G01J 5/12* (2006.01)
(52) U.S. Cl.
  CPC . *G01J 3/18* (2013.01); *G01J 5/12* (2013.01); *G02B 23/06* (2013.01); *G01J 2003/2813* (2013.01)
(58) Field of Classification Search
  CPC ...... G01J 3/0262; G01J 3/0291; G01J 3/0208; B64G 1/66; B64G 2001/1064; B64G 1/105; G02B 23/06
  See application file for complete search history.

(56) References Cited

U.S. PATENT DOCUMENTS

| | | | | |
|---|---|---|---|---|
| 5,371,358 | A | * | 12/1994 | Chang ................ G01J 3/28 250/236 |
| 6,100,974 | A | * | 8/2000 | Reininger ............ G01J 3/2823 356/303 |
| 6,222,187 | B1 | * | 4/2001 | Shivanandan ......... G01J 3/443 250/339.05 |
| 6,480,333 | B1 | | 11/2002 | Maker et al. |
| 2003/0057374 | A1 | * | 3/2003 | Schuebel ............... G01J 3/453 250/339.08 |
| 2005/0248758 | A1 | * | 11/2005 | Carron .................. G01J 3/44 356/301 |
| 2010/0072514 | A1 | * | 3/2010 | Ting .................. H01L 31/0304 438/94 |
| 2010/0321688 | A1 | * | 12/2010 | Bodkin .................. G01J 3/02 356/326 |
| 2013/0228887 | A1 | * | 9/2013 | Wehner ............. H01L 31/02325 257/E27.128 |
| 2013/0250301 | A1 | * | 9/2013 | Feitisch ............... G01N 21/274 356/409 |
| 2015/0137295 | A1 | * | 5/2015 | Wehner ............. H01L 31/03046 257/432 |
| 2020/0049554 | A1 | * | 2/2020 | Farsad .................. G01J 3/021 |
| 2020/0096388 | A1 | * | 3/2020 | Pagano ................. G01J 3/0286 |
| 2020/0249091 | A1 | * | 8/2020 | Scherer ................. G01J 3/0291 |
| 2022/0099489 | A1 | * | 3/2022 | Weidmann ............. G01J 3/108 |

OTHER PUBLICATIONS

A. Soibel, et al., "Mid-wavelength infrared InAsSb/InSbnBn detector with extended cut-off wavelength," *Appl. Phys. Lett.* 109(10), 103505 (2016). 6 pages.

C. K. Materese, et al., "Ice chemistry on outer solar system bodies: electron radiolysis of $N_2$-, $CH_4$-, and $CO$-containing ices," Astrophys. J. 812(2), 150 (Oct. 20, 2015). 10 Pages.

C. M. Pieters, et al., "Character and spatial distribution of $OH/H_2O$ on the surface of the Moon seen by M3 on Chandrayaan-1," *Science* 326 (5952), 568-572 (2009). 7 Pages.

D. Daou, "Small innovative missions for planetary exploration," in European Planetary Science Congress 2017 (Abstract#EPSC2017-146, 2017). 2 Pages.

D. L. Johnson, et al., "The Ricor K508 cryocooler operational experience on Mars," *AIP Conf. Proc.* 1573(1), 1792-1799 (2014). 10 Pages.

D. Takir and J.P. Emery, "Outer Main Belt asteroids: Identification and distribution of four 3-μm spectral groups," *Icarus* 219(2), 641-654 (2012). 15 Pages.

D. Z.-Y. Ting, et al., "A high-performance long wavelength superlattice complementary barrier infrared detector," *Appl. Phys. Lett.* 95(2), 023508 (Apr. 8, 2009). 5 Pages.

D. Z.-Y. Ting, et al., "Exclusion, extraction, and junction placement effects in the complementary barrier infrared detector," *Appl. Phys. Lett.* 102(12), 121109 (Jan. 28, 2013). 6 Pages.

E. B. Johnson, et al., "Development of the LunaH-Map miniature neutron spectrometer," *Proc SPIE* 10392, 103920H (2017). 12 pages.

G. Mariani and M. Kenyon, "Room-temperature remote sensing: Far-infrared imaging based on thermopile technology," in *2015 40th International Conference on Infrared, Millimeter, and Terahertz Waves* (IRMMW-THz) (2015), pp. 1-2. 3 Pages.

M. C. De Sanctis, et al., "The VIR Spectrometer," *SpaceSci. Rev.* 163(1), 329-369 (2011). 42 Pages.

M. C. Foote and E.W. Jones, "High-performance micromachined thermopile linear arrays," *Proc. SPIE* 3379, 192-197 (Jul. 22, 1998). 8 Pages.

M. C. Foote, et al., "Thermopile detector arrays for space science applications," in International Workshop on Thermal Detectors for Space Based Planetary, Solar, and Earth Science Applications (TDW, 2003), 6 pages.

M. C. Foote, et al., "Uncooled thermopile infrared detector linear arrays with detectivity greater than 10/sup 9/cmHz/sup 1/2/W," in IEEE transactions on Electron Devices (IEEE, Sep. 1998), 45, pp. 1896-1902. 8 Pages.

M. M. McAdam, et al., "Aqueous alteration on asteroids: Linking the mineralogy and spectroscopy of CM and CI chondrites," *Icarus* 245, 320- 332 (2015). 14 Pages.

P. Maker, et al., "New Convex Grating Types Manufactured by electron Beam Lithography," in *Diffractive Optics and Micro-Optics 10, OSA Technical Digest Series* (1998), pp. 234-236. 5 pages.

P. Mouroulis, et al, "Convex grating types for concentric imaging spectrometers," *Appl. Opt.* 37(31), 7200-7208 (1998). 10 Pages.

P. Mouroulis et al., "Optical design of a coastal ocean imaging spectrometer," *Opt. Express* 16(12), 9087 (2008). 11 pages.

P. R. Christensen, et al., "The OSIRIS-REx Thermal Emission Spectrometer (OTES) Instrument," *SpaceSci. Rev.* 214(5), 87 (2018). 40 Pages.

P. Voosen, "NASA to pay private space companies for moon rides," *Science* 362(6417), 875-876 (2018). 4 Pages.

T. D. Glotch, et al., "Highly Silicic Compositions on the moon," *Science* 329(5998), 1510-1513(2010). 6 Pages.

T. Okada, et al., "Thermal Infrared Imaging Experiments of C-Type Asteroid 162173 Ryugu on Hayabusa2," *Space Sci. Rev.* 208(1), 255-286 (2017), 33 pages.

W. Wilson, et al., "Recent advances in blazed grating fabrication by electron-beam lithography," Proc. SPIE 5173, 51730E (2003) 14 pages.

* cited by examiner

500

| ATTRIBUTE | VALUE | |
|---|---|---|
| | MWIR band | LWIR band |
| Detector Type | BIRD | Thermopile |
| Spectral coverage | 2-4 μm | 5.5-12μm |
| FOV | 3.0 mrad | 2.7 mrad |
| F/# | 2.3 | |
| Focal length | 8.2 mm | |
| Number of channels | 200 | 22 |
| Δλ | 10 nm | 290 nm |
| Pitch | 24 μm | 225 μm |

*FIG. 5*

MID-WAVE AND LONG-WAVE INFRARED POINT SPECTROMETER

CROSS REFERENCE TO RELATED APPLICATIONS

The present application claims priority to U.S. Prov. App. No. 62/929,628 filed on Nov. 1, 2019 incorporated herein by reference in its entirety.

STATEMENT OF GOVERNMENT GRANT

This invention was made with government support under Grant No. 80NM0018D004 awarded by NASA (JPL). The government has certain rights in the invention.

INCORPORATION BY REFERENCE

All references and citations used throughout the present document, see e.g. references in square brackets and last paragraph of the specification, are incorporated herein by reference in their entirety.

FIELD

The present disclosure is related to spectrometers, and more particularly to high resolution and highly integrated mid-wave and long-wave infrared point spectrometers for spacecrafts.

BACKGROUND

Successful implementation of small spacecraft missions, singly or in fleets, to accomplish high priority planetary exploration requires small, highly capable, and readily-replicable science instruments.

Imaging and point spectrometers are known from the Dawn [1], Hayabusa2 [2], and OSIRIS-REx [3] missions to asteroids. However, separate instruments are used to assess the reflected and emitted light ranges, and these large instruments are not compatible with the emerging classes of small satellites and small landers. A small neutron spectrometer (e.g., Mini-NS in LunaH-Map [4], developed for the Moon) can quantify H abundance coarsely for a slow asteroid flyby, but precise estimates require weeks to months of integration with inherently low spatial resolution, making volatile heterogeneity assessment for small asteroids difficult to impossible. For multiple flybys on a compact platform, a point spectrometer with integrated wavelength range coverage is both feasible and scientifically compelling.

Looking more broadly, similar questions of high priority turn up in the science and exploration of planetary surfaces across the solar system from asteroids to terrestrial bodies to icy worlds. With the number of small satellite (e.g., SIMPLEx [5]) and small lander (e.g., CLPS [6], PRISM [7]) opportunities on the rise, the need for an instrument with compact design and science performance has increased.

SUMMARY

The inventors have conceived the mid-wave and long-wave infrared point spectrometer (MLPS) according to the present disclosure when seeking an instrument for a multi-spacecraft near-earth asteroid (NEA) Cubesat® mission concept to provide quantitative answers to three specific questions relevant to how small bodies (NEAs, asteroids, Martian moons, comets, etc.) formed and can act as tracers for the dynamical evolution of the solar system: (1) What is the quantity of water in each object? (2) In what phase(s) is the water incorporated (i.e. ice vs. hydrated silicate minerals)? and (3) Are organics or other volatiles present, and if so, what types and in what form?

The disclosed methods, systems and devices address and provide practical solutions to the above-mentioned problems and needs.

The disclosed methods and systems can be used to determine the form, abundance, distribution, and time variation of volatiles. The described MLPS' wavelength range, spectral resolution, and signal-to-noise ratio (SNR) in, for example, the 2-4 μm range may be optimized to discriminate the form and quantity of water at the surface, OH, adsorbed H2O, or H2O ice, via measurement of the OH/H2O stretch vibration at, for example ~3 μm. Moreover, with sufficient integration time on a sunlit surface, the disclosed MLPS may also be used to sense the H2O bend at, for example, ~6 μm in its 5.5-12 μm channel.

Additional volatiles like C—H in aliphatic organics, NH4+ in minerals, and NH3, CO2, and CH4 ices also have diagnostic absorptions in the disclosed MLPS' 2-4 μm spectral range. The mentioned dual wavelength range may also be used to measure volatile content and temperature simultaneously for surfaces providing both accurate quantification by correction of thermal emission addition to the 3 μm feature as well as understanding temperature controls on volatile distribution. Applications include mapping the heterogeneity of water-rich asteroids (Takir & Emery, 2012) [8], quantification of water on airless bodies like the Moon (e.g. Pieters et al., 2009) [9], and investigation of ice-organic mixtures in bodies of the outer solar system (see, for example, Materese, Astrophys. J. 2015) [10].

Embodiments in accordance with the teachings of the present disclosure may be used to determine the composition of rocks and soils and study the stratigraphy and the evolution of the planetary surfaces. The disclosed MLPS long-wave infrared wavelength range can be used to capture the Si—O feature (8-12 μm) related to silicate polymerization and can thus resolve the presence of key minerals, identify discrete silicate lithologies, and distinguish amorphous versus crystalline materials. These characteristics enable quantitative modeling of surface composition, tracing the history of interior, volcanic, and impact processes affecting a planetary surface. Examples include mapping the degree of silicate alteration in asteroids (e.g. McAdam et al., 2015, Icarus) [11], compositional discrimination of igneous units on the Moon, see e.g. Paige et al., 2010 [12], and mapping stratigraphic variation on Mars, see Rogers et al., 2018 [13].

The teachings of the present disclosure may further be exploited to determine the thermophysical and geotechnical planetary surface properties. Multiple time-of-day measurements in the mid-wave and long-wave spectral ranges can provide detailed measurements of diurnal temperature range to determine surface thermal inertia, effected by rock abundance, particle size, and porosity. Long-wave infrared data in the transparency feature region (5.5-8 μm) also allow independent estimation of grain size.

In addition to their relevance for planetary science, the mentioned capabilities offered by the teachings of the present disclosure also provide information relevant to exploration and planetary defense. The described MLPS enables assessment of the quantity and extractability of resources from water-rich targets for In Situ Resource Utilization (ISRU) as well as generates geotechnical data for interaction with planetary surfaces and for studies of asteroid properties.

Further aspects of the disclosure are provided in the description, drawings and claims of the present application.

According to a first aspect of the present disclosure, a spectrometer is disclosed, comprising: an optical assembly including a telescope, a grating and a relay system; and a focal plane module including a first detector and a second detector, wherein: i) the optical assembly is configured to: receive light from an object or scene through the telescope, thereby focusing the light, and split focused light by the relay system into a first beam within a first spectral range and a second beam within a second spectral range different from the first spectral range, and ii) the focal plane module is configured to: receive the first beam by the first detector to generate a first output signal in correspondence with a spectral content of the first beam, and receive the second beam by the second detector to generate a second output signal in correspondence with a spectral content of the second beam.

According to a second aspect of the present disclosure, a method of spectrometry is provided, comprising: receiving light from an object or a scene; focusing the light; splitting the light into a first beam within a first spectral range and a second beam within a second spectral range; focusing the first beam on a first detector and the second beam on a second detector; generating by the first detector a first output signal in correspondence with a spectral content of the first beam; and generating by the second detector a second output signal in correspondence with a spectral content of the second beam

BRIEF DESCRIPTION OF THE DRAWINGS

FIG. 5 shows a table summarizing various exemplary performance attributes of an MLPS according to an embodiment of the present disclosure.

DETAILED DESCRIPTION

Figure 1A:
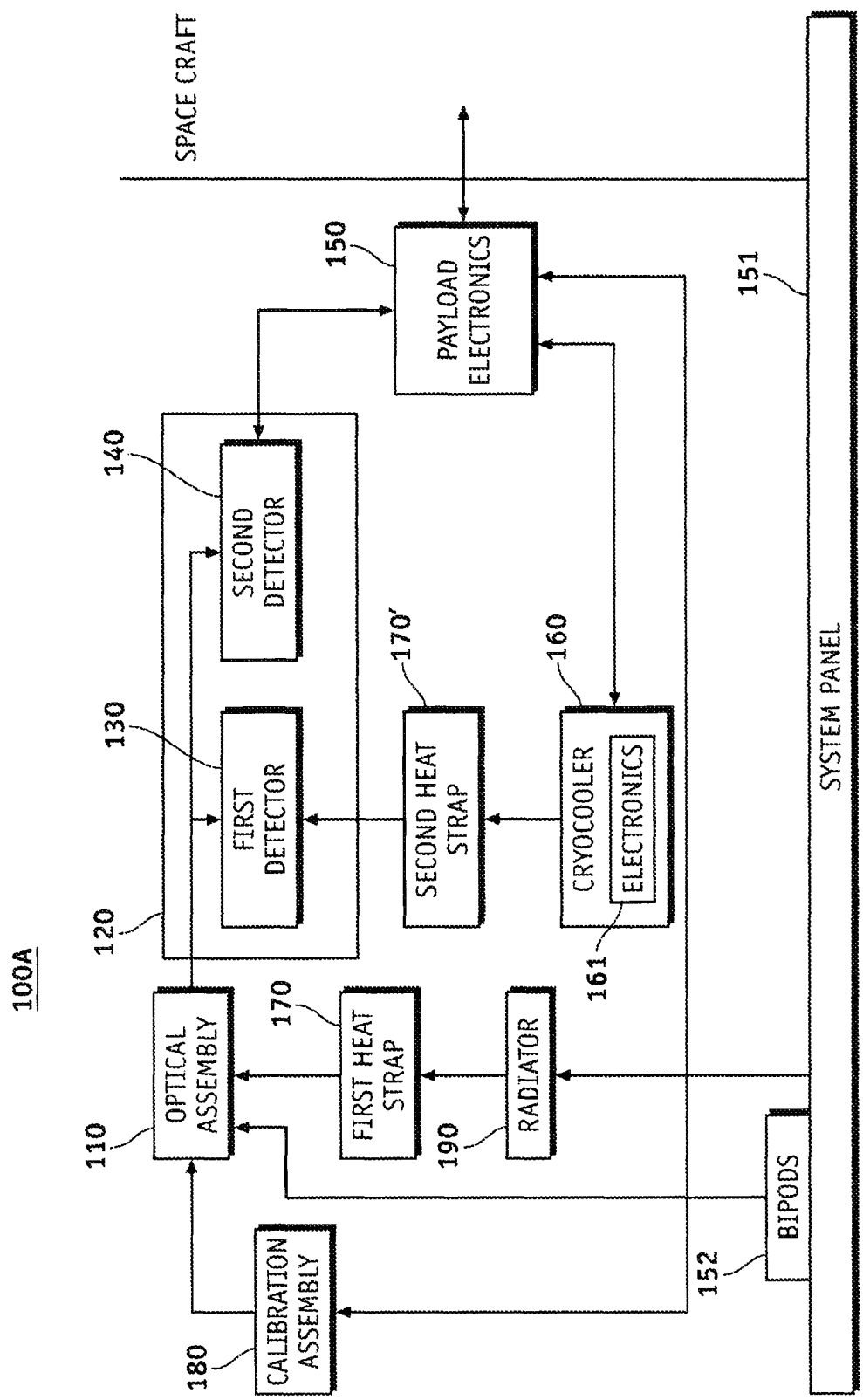
FIG. 1A shows an exemplary MLPS according to an embodiment of the present disclosure.

FIG. 1A shows an exemplary MLPS (100A) according to an embodiment of the present disclosure. MLPS (100A) comprises optical assembly (110) coupled to a focal plane module (120). MLPS (100A) may be configured to measure two spectra of the same spatial instantaneous field of view (IFOV) at two radiation passbands (e.g. mid-wave, $\lambda=2$ μm to 4 μm and long-wave, $\lambda=5.5$ μm to 12 μm).

Light received through system panel (151) is guided to optical assembly (110) using the calibration mirror (181) in (180). As will be described more in detail, the received light is split up in optical assembly (110) and refocused to form two spectra passing through the focal plane module (120) including a first detector (130) and second detector (140).

Figure 1B:
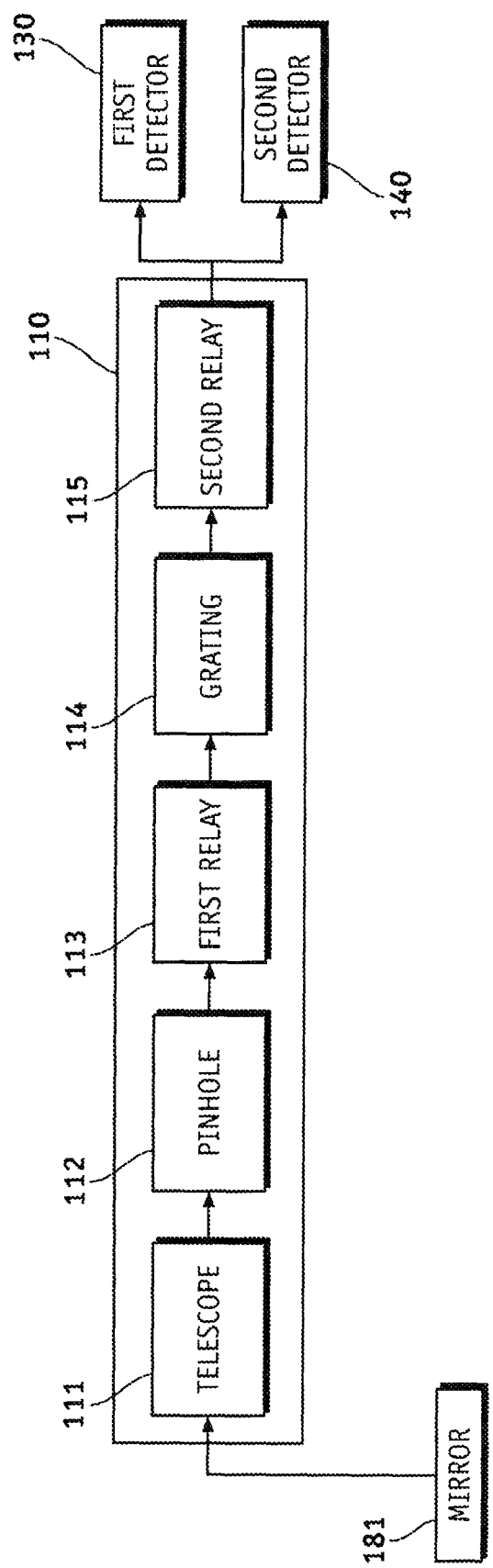
FIG. 1B shows an exemplary implementation of an optical assembly according to an embodiment of the present disclosure.

FIG. 1B shows an exemplary implementation of optical assembly (110) according to an embodiment of the present disclosure. For the sake of clarity, the connections of optical assembly (110) to first heat strap (170) and first detector (130) and second detector (140) of focal plane module (120) are also shown in the figure. According to the example shown in FIG. 1B, optical assembly (110) comprises telescope (111), pinhole (112) functioning as a spatial filter, first relay (113), grating (114), and second relay (115). Telescope (111) may be a two-mirror telescope used to feed radiation stimulus from the scene or an object through pinhole (112) and into first relay (113). Pinhole (112) may be placed at the focus of telescope (111) which forms the instantaneous field of view (IFOV). The entire optical assembly (110) may be held slightly below ambient temperature to reduce contribution from the background thermal radiation. The temperature is reduced using passive means (e.g. radiator hooked to fluid loop). The radiator (190) and heat strap (170) function as a heat transfer device to maintain the optics temperature.

With continued reference to FIG. 1B, according to the teachings of the present disclosure, first relay (113) may be a three-mirror Offner® relay with a concentric reflective design and having typically a primary, a secondary and a third tertiary mirror. All Offner® optical mirrors may be diamond-turned into aluminum substrates and overcoated using evaporative deposition with gold. Grating (114) may be a bi-faceted grating that may be held where the secondary mirror of the Offner® relay (i.e. first relay (113)) would be. In other words, grating (114) may be implemented as a bi-faceted grating, embodied by two diffraction grating designs on one mirror substrate with a different diffraction grating written on each facet. Such bi-faced grating allows light to be split, thereby forming two separate spectra. As mentioned previously, such two spectra, generated by a combination of first relay (113) and grating (114) are received by second relay (115) to be refocused and then captured by two different focal planes represented as first detector (130) and second detector (140) previously shown in FIG. 1A. In accordance with the teachings of the present disclosure, grating (114) disperses the input light into two parallel passbands of mid-wave infrared, MWIR (e.g. 2-4 μm), and long-wave infrared, LWIR (e.g. 5.5-12 μm), with a spatial separation of 5 mm. As mentioned previously, grating (114) is placed at the secondary mirror position of the relay and forms the pupil stop for the overall system.

With further reference to FIG. 1B, as mentioned previously, an exemplary implementation of grating (114) may be a bi-faceted grating on each side of a secondary mirror of an Offner® relay. A convex reflective bi-faceted grating may be patterned by analog direct-write electron-beam (E-beam) lithography in polymethyl methacrylate (PMMA) resist on a convex diamond-turned substrate [14, 23-25]. A standard blaze grating design may be used since each previously mentioned exemplary passband (i.e. 2-4 μm, 5.5-12 μm) is a single octave. Splitting the pupil and writing two different diffraction gratings on one substrate has the effect of combining two spectrometers into one. Precision tilts may be written into the aluminum substrate to make sure each dispersion is held side by side. The two dispersions are held as close together as possible while still maintaining acceptable optical aberrations. This distance in the focal plane is consistent with the minimum distance possible between the two detectors. In summary and in view of the above description, the disclosed devices make use of two different diffraction grating designs fabricated by E-beam lithography on a bi-faceted convex substrate.

With continued reference to FIG. 1B and with regards to the exemplary implementation of first relay (113), i.e. the Offner® relay, the Offner® stop may be located at the position of the secondary mirror, and the entrance and exit pupils may be at infinity. All odd aberrations are theoretically cancelled out since the Offner® design in its pure form is symmetric about the stop. The bi-faceted grating may impact the symmetry, so the grating tilt may be allowed to vary in the design to counter-balance the effects. An approach which balances astigmatism for a 2-D field stop while maintaining an acceptable object space numerical aperture (NA) may be undertaken. In such an approach, a working f-ratio of less than 3 may be maintained. The exemplary Offner® relay may have the primary mirror split into a primary and tertiary to minimize the size and allow aberration optimization between the two mirrors.

With reference again to FIG. 1A, In accordance with embodiments of the present disclosure, first detector (130) may be a high-operating-temperature barrier infrared detector (HOT-BIRD) implementing photon sensing technology, and second detector (140) comprises a thermal detector including an array of micro-sized thermopile detectors. Moreover, first detector (130) and second detector (140) may be disposed in separate housings, while each detector is separately thermally controlled.

Figure 1C:
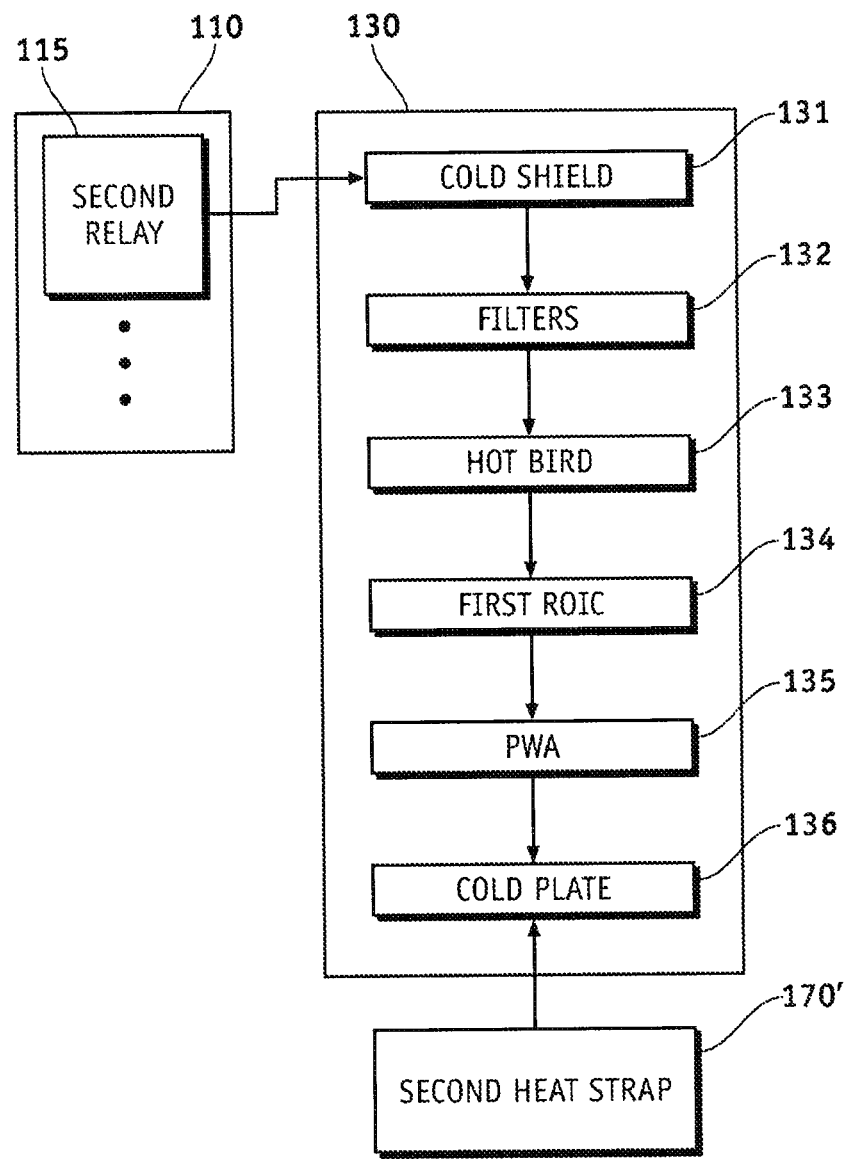
FIG. 1C shows an exemplary implementation of a high-operating-temperature barrier infrared detector (HOT BIRD) according to an embodiment of the present disclosure.

FIG. 1C shows an exemplary implementation of first detector (130) in accordance with an embodiment of the present disclosure. A portion of dispersed light (e.g. 2-4 μm, 5.5-12 μm) coming from second relay (115) of FIG. 1B is fed into HOT BIRD (133) via cold shield (131) and filters (132) keeping out unwanted light. HOT BIRD (133) may be hybridized to a first readout integrated circuit, ROIC (134), and the combination of HOT BIRD (133) and ROIC (134) may be placed on a printed wire assembly, PWA (135) bonded to a cold plate (136). In accordance with embodiments of the present disclosure, Hot BIRD (133) may be a 512×640 pixels focal plane array (FPA) with 24 μm pitch.

Referring back to FIG. 1A, MLPS (100A) further comprises second heat strap (170'), cryocooler (160) including cryocooler electronics (161), and payload electronics (150). With reference to the combination of FIG. 1A and FIG. 1C, cryocooler (160) is coupled to cold plate (136) via second heat strap (170') and may be used to maintain the temperature of HOT BIRD (133) at, for example 140K. The mentioned temperature control may be performed by implementing a proportional-integral-derivative (PID) controller as part of cryocooler electronics (161), the PID controller being controlled by the payload electronics (150).

Figure 1D:
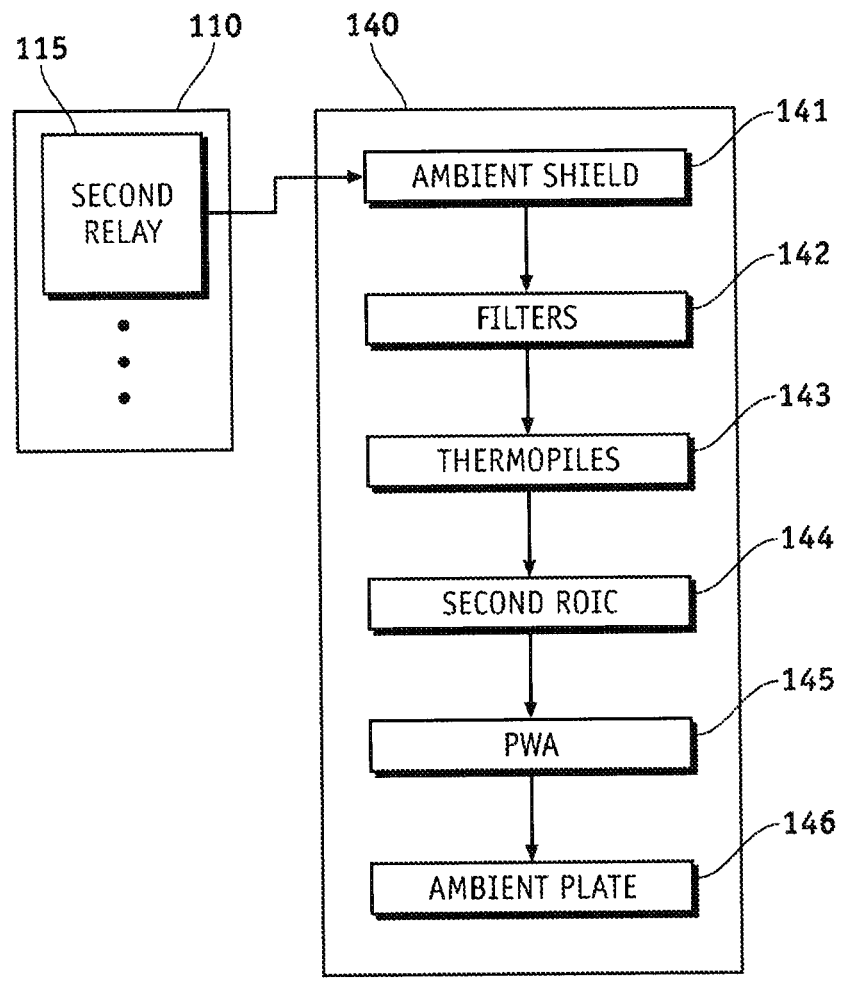
FIG. 1D shows an exemplary implementation of a thermal detector according to an embodiment of the present disclosure.

FIG. 1D shows an exemplary implementation of the second detector (140) in accordance with an embodiment of the present disclosure. A portion of dispersed light (e.g. 5.5-12 μm) coming from the second relay (115) of FIG. 1B is fed into thermopiles (143) via ambient shield (141) and filters (142) keeping out unwanted light. Thermopiles (143) may comprise an array of micro-sized thermopile detectors wire bonded to a second ROIC (144). The combination of thermopiles (143) and ROIC (144) may be disposed on a PWA (145) and attached to an ambient plate (146). Thermopiles (143) may be held at ambient temperature. With reference to FIGS. 1C-1D, first ROIC (134) generate analog outputs in response to the corresponding spectrum received by HOT BIRD (133), and second ROIC (144) generates digital outputs in response to the corresponding spectrum received from the thermopiles (143). The analog signal from HOT-BIRD (133) has its own associated digitizer. Payload electronics (150) may include local central processing units to receive the digitized signals for analysis With further reference to FIGS. 1C-1D, it is pointed out that a single focal plane covering the MLPS large passband would normally require cooling down to 60 degrees K. Operating at this temperature requires use of a bulky power-hungry cooler (or multiple coolers). The person skilled in the art will appreciate that, on the other hand, an MLPS designed according to the teachings of the present disclosure avoids this issue by only cooling the shorter wavelength focal plane to 140 degrees K. The hot BIRD detectors may be hybridized to a ROIC array forming a large 2-D sensing area. The use of a 2-D array is for convenience only since MLPS uses but a fraction of the array, since it's a point spectrometer. As mentioned previously, the longer wave channels use a thermopile line array which doesn't require cooling to sense changes in temperature.

Figure 1E:
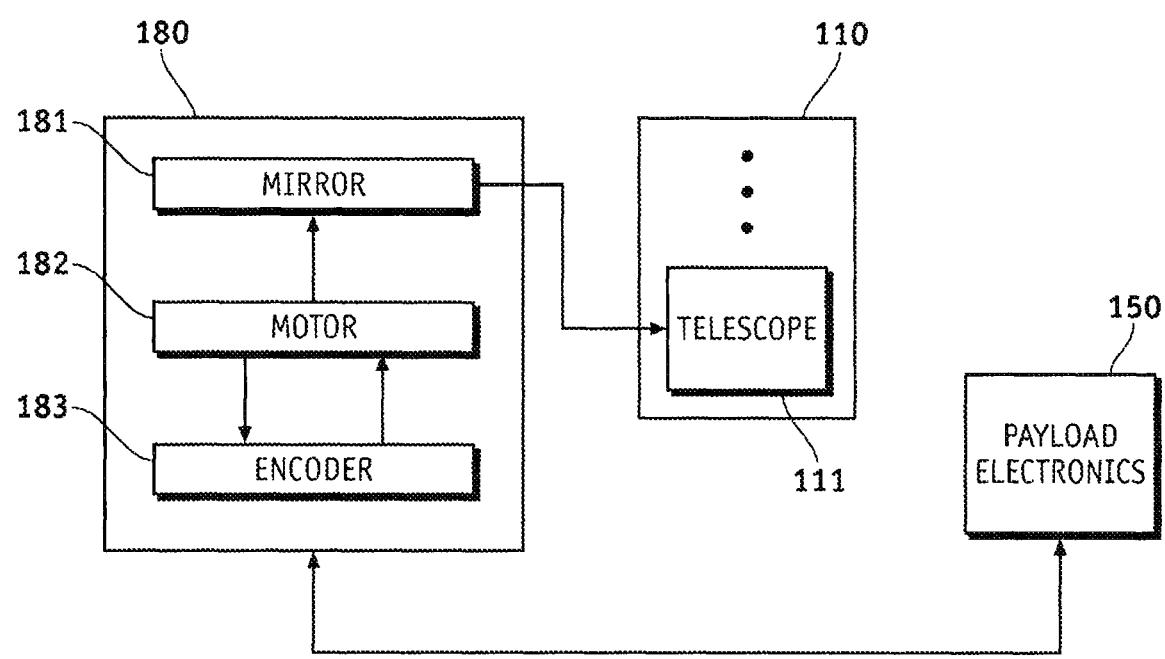
FIG. 1E shows an exemplary implementation of a calibration assembly according to an embodiment of the present disclosure.

Referring back to FIG. 1A, MLPS (100A) further comprises a calibration assembly (180) used to calibrate telescope (111) of FIG. 1B. As shown in FIG. 1E, calibration assembly (180) comprises mirror (181), motor (182), and encoder (183). Electronics commands for the position of motor (182) are provided by payload electronics (150). According to embodiments of the present disclosure, the combination of various constituents of MLPS (100A) may be attached to an instrument bulkhead (151) using bipods (152).

Figure 2A:
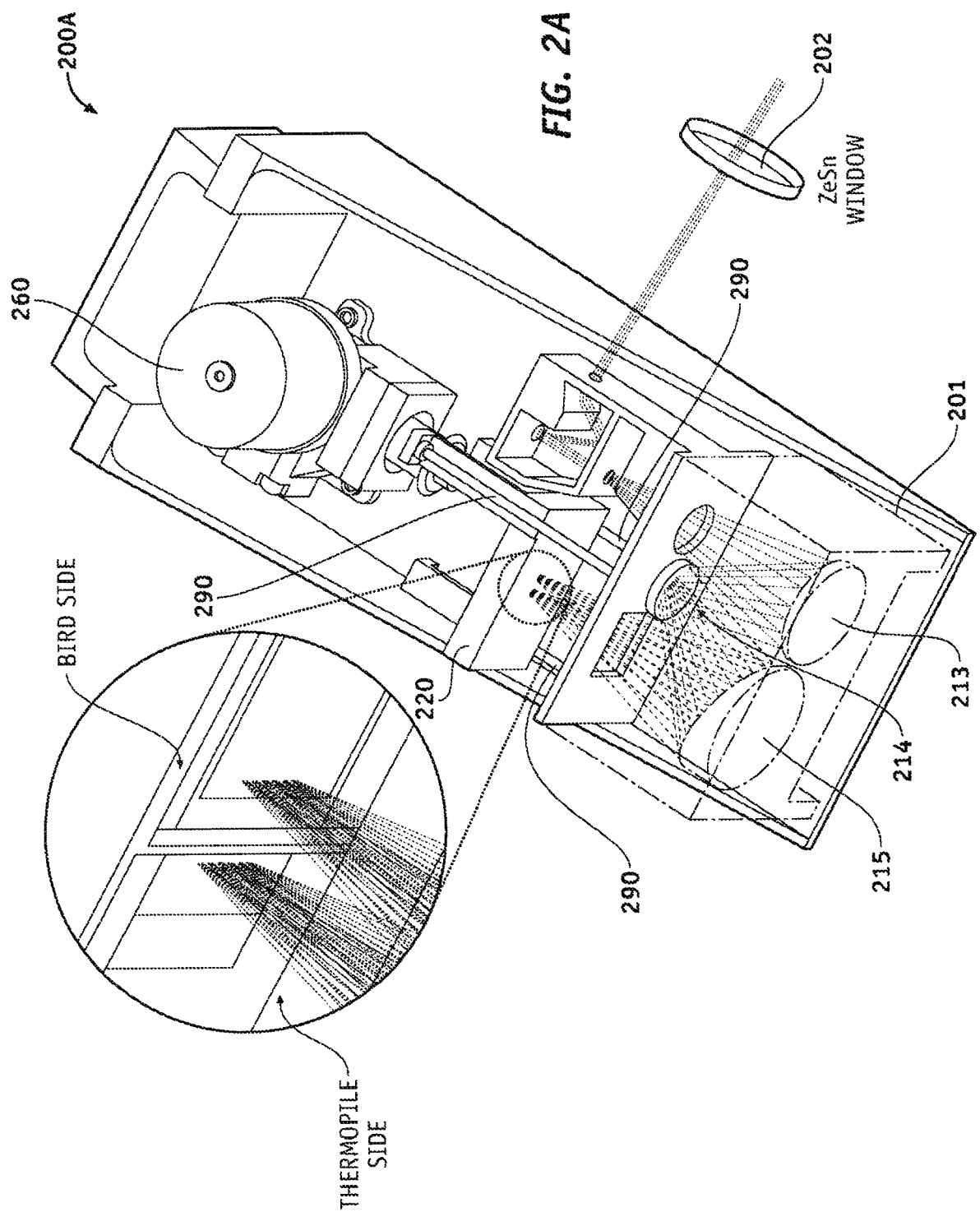
FIGS. 2A-2C show different views of an exemplary MLPS according to an embodiment of the present disclosure.

FIG. 2A shows a three-dimensional illustration of an MLPS (200A) according to an embodiment of the present disclosure. MLPS (200A) includes first relay (213), grating (214) and second relay (215) all disposed inside spectrometer housing (201). Telescope module (211), focal plane module (220), and cryocooler (260) are also show in FIG. 2A. The functionalities of first relay (213), grating (214), second relay (215), telescope module (211), focal plane module (220), and cryocooler (260) are similar to what was described with regards to their counterparts of FIGS. 1A-1B. As shown, the collimated beam enters an optical IR transparent ZnSe (zinc selenide) window (202) before hitting and getting focused by telescope module (211). A zoomed-in version of the split light on each of the HOT-BIRD and thermopile sides is also shown. The focal plane module (220) may be mounted on spectrometer housing (201) through three rods (290) made of, for example, titanium, with diameter of, for example, ⅛ inch. To reduce the thermal load, the mounts on focal plane module (220) may be extruded out to extend the three rods (290) for reducing the conductive heat load. Focal plane module (220) may be wrapped with multi-layer insulation sheets to reduce the emissivity of focal plane module (220).

Figure 2B:
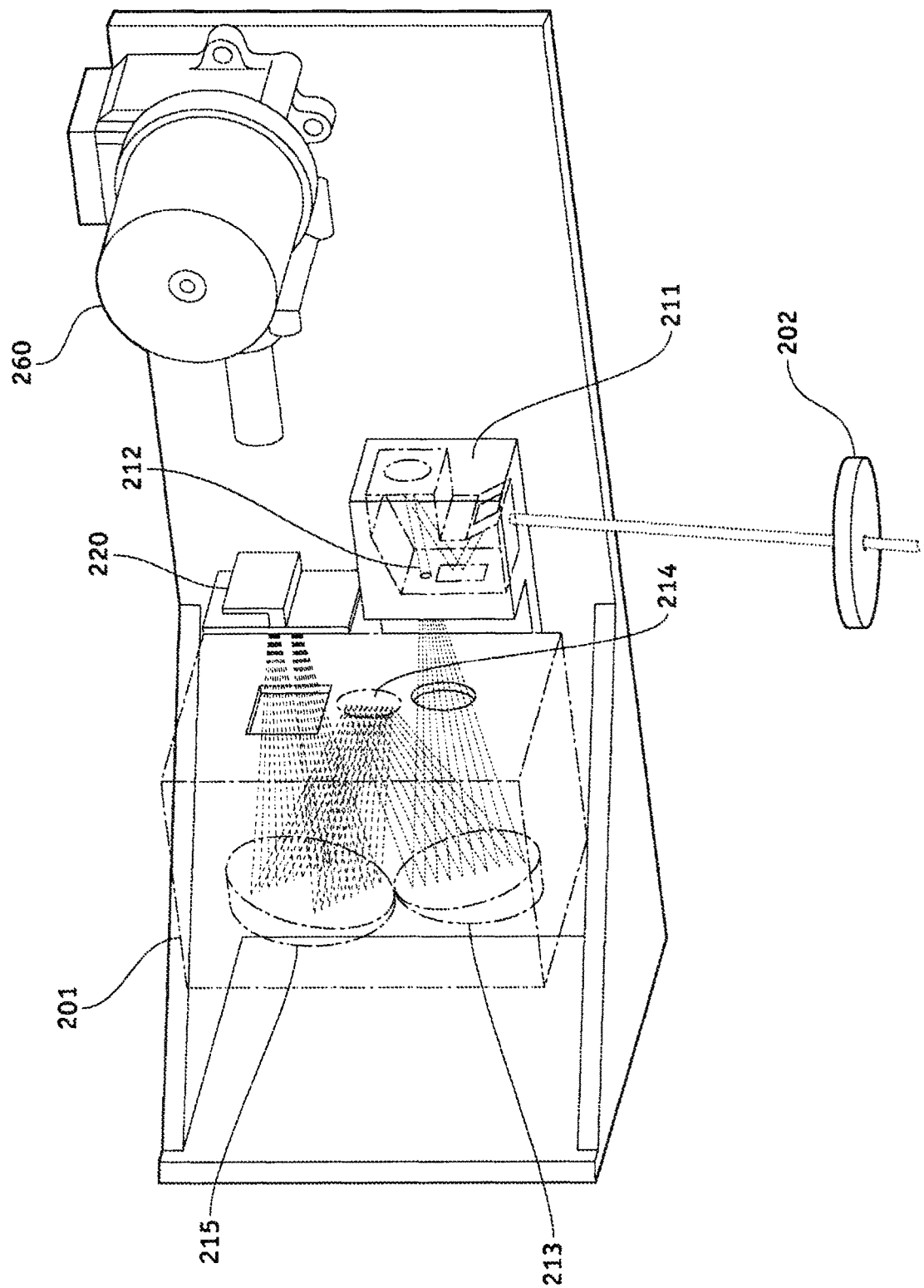
Figure 2C:
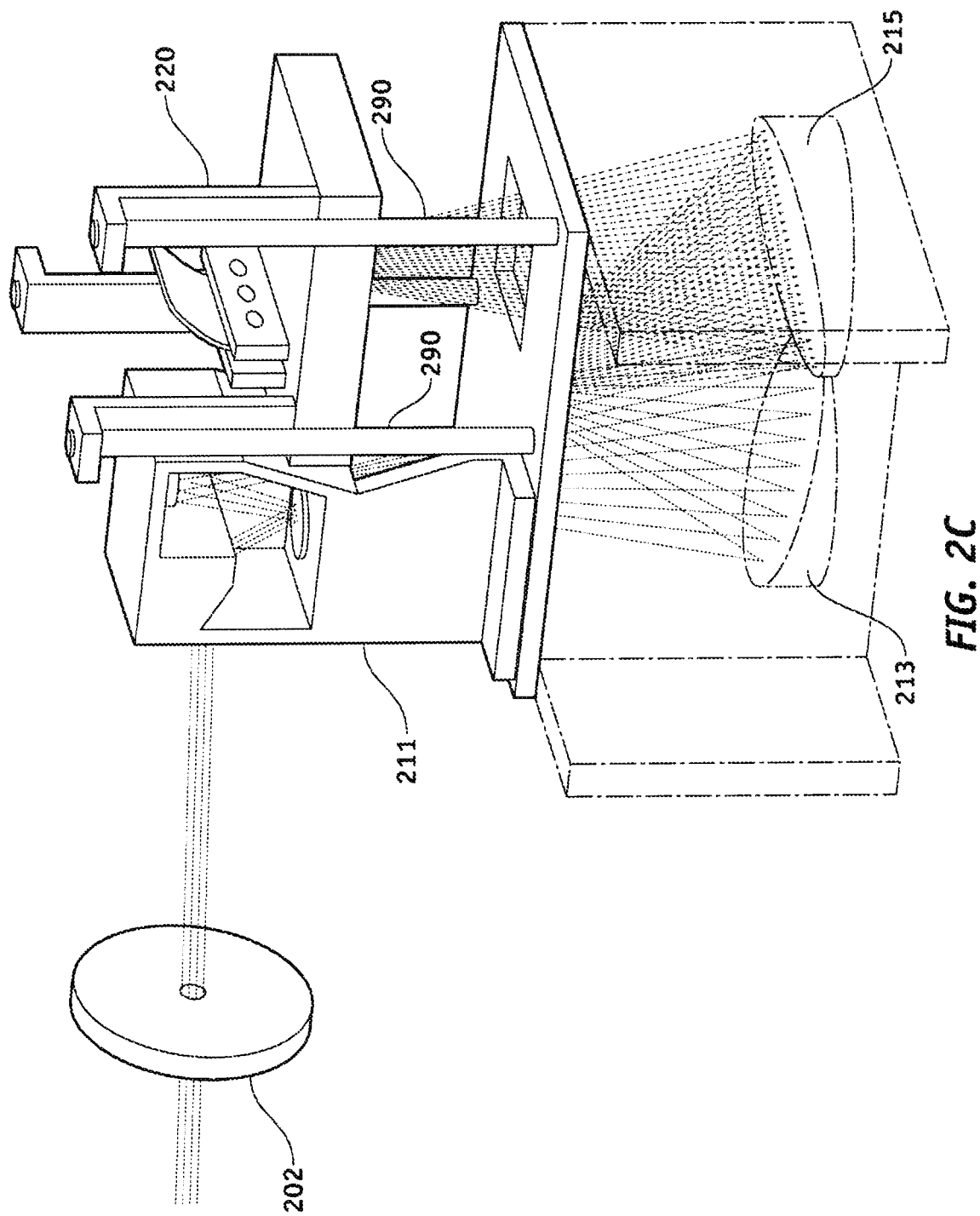

FIGS. 2B-2C shows two different views of the MLPS (200A) of FIG. 2A with same elements shown with the same numerals. Pinhole (212) is also shown in FIG. 2B.

Figure 3:
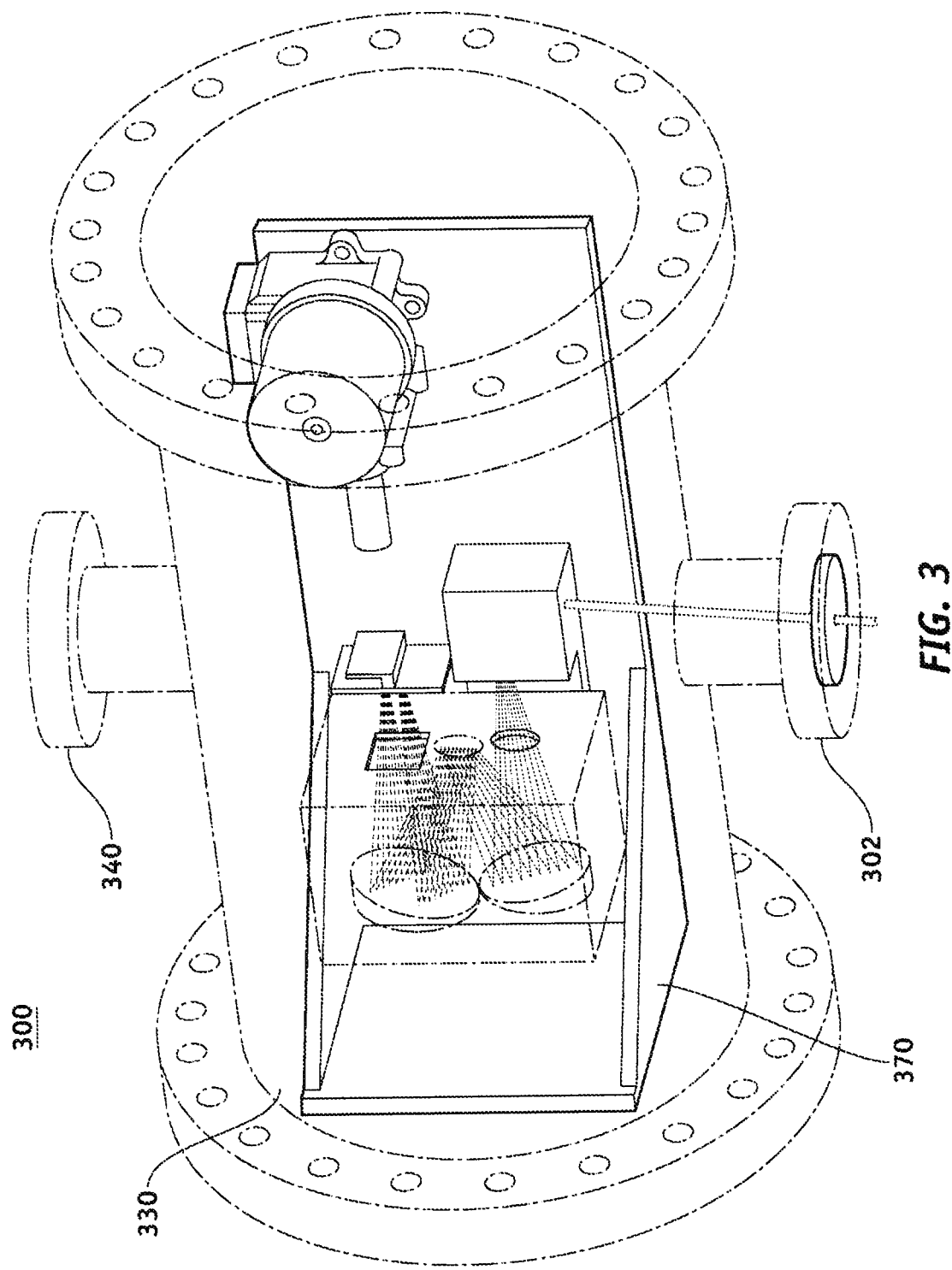
FIG. 3 shows an exemplary measurement system according to an embodiment of the present disclosure.

Making reference to FIG. 3, in order to evaluate the performance of the disclosed methods and devices, the inventors implemented a measurement system (300), wherein various elements of the MPLS (200A) of FIG. 2A were mounted on a testbed (370), with the whole system sitting in a vacuum chamber (330). Vacuum pump port (340) and ZnSe window (302) where light enters the system are also shown in FIG. 3. Thermal design to control the temperature of the focal plane module (120) was implemented by using, for example a Ricor® K508 rotary stirling cryocooler [26] to cool down the detectors to the desired operating temperatures. Cryocooler (160) was charged with 30 bar helium to produce a refrigeration capacity of 0.7 W at 77 K. The testbed bench maintained at 5° C. by an attached cold plate with circulating polycool EG −25 as coolant serves as a heat sink for the cryocooler. The cooler Hybrid 18 electronics was powered by a regulated 23 Vdc from a DC-DC converter. The closed-loop mode was applied to run the cryocooler, which kept the cold tip within ±5 mK stability at a temperature slightly lower than the desired FPM temperature with the internal PID controller in the cooler. The thermal strap, a heater buried in the FPM housing, and an external PID controller together maintained the focal plane module as well as the BIRD side at ~130 K within ±2 mK stability.

Figure 4:
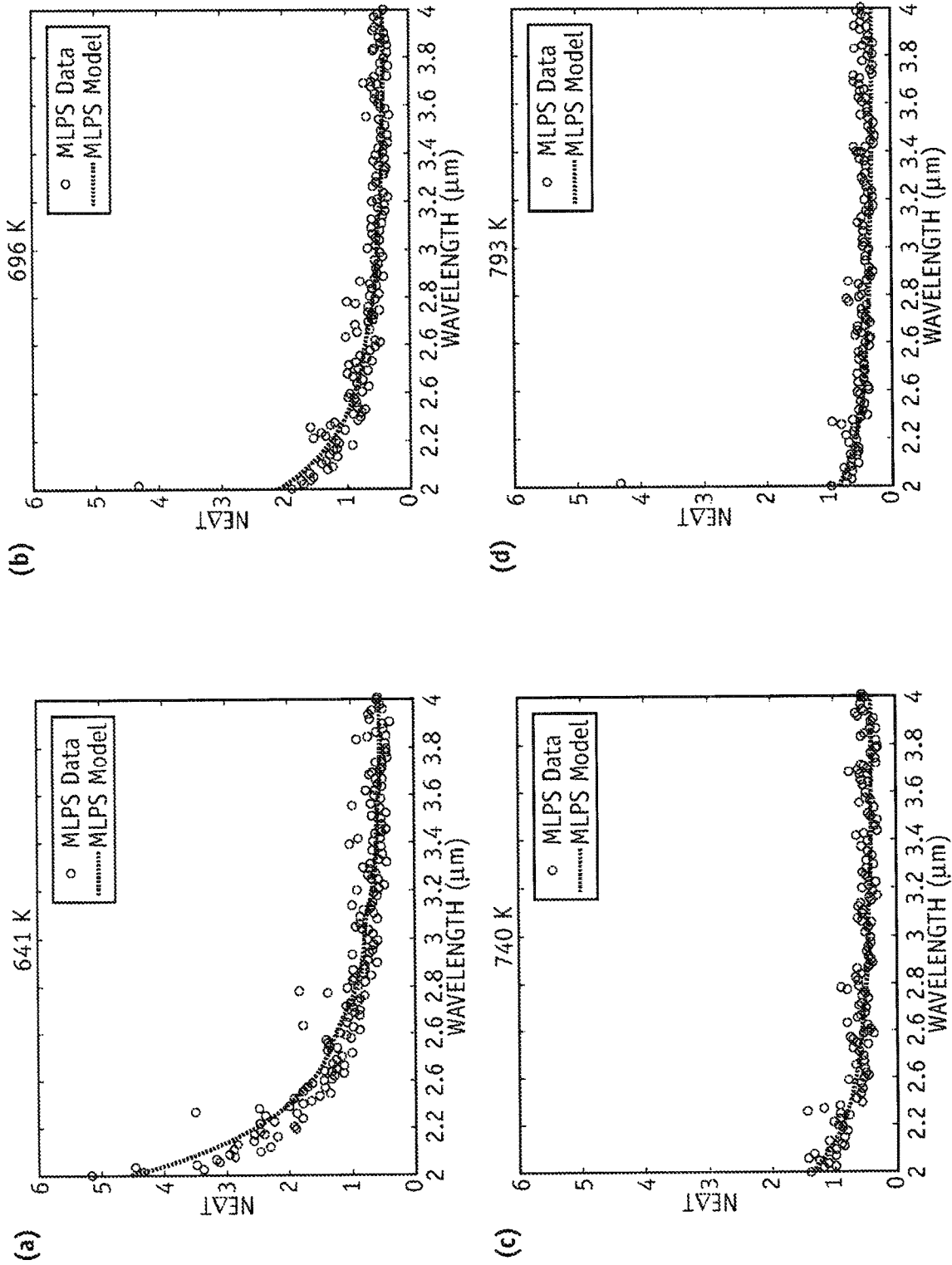
FIG. 4 shows exemplary MPLS performance results according to an embodiment of the present disclosure.

FIG. 4 shows graphs of noise equivalent delta temperature (NEDT) vs. wavelength for 4 different blackbody temperatures, i.e. 641 degrees K, 696 degrees K, 740 degrees K, and 793 degrees K. The solid line shows the MLPS theoretical model while measurements obtained are shown with bubbles. FIG. 5 shows a table (500) summarizing various exemplary performance attributes of an MLPS in accordance with embodiments of the present disclosure.

In view of what described throughout the disclosure, the person skilled in the art will appreciate that the disclosed methods and devices leverage, customize and extend three different technologies, i.e. bi-faceted gratings [14], barrier infrared detectors BIRDs [15,16], and thermopile detectors to make it possible to measure the medium-wave infrared (e.g. $\lambda$=2 μm to 4 μm) and the long-wave infrared (e.g. $\lambda$=5.5 μm to 12 μm) simultaneously in a payload that fits in a, for example, 2 U volume. The disclosed concept can be used to design flight spectrometers that will cover the broad solar reflectance plus thermal emission spectral range with a compact and low-cost instrument suitable for small spacecraft reconnaissance of asteroids, the Moon, and planetary satellites as well as mass-constrained landed missions.

Figure 6:
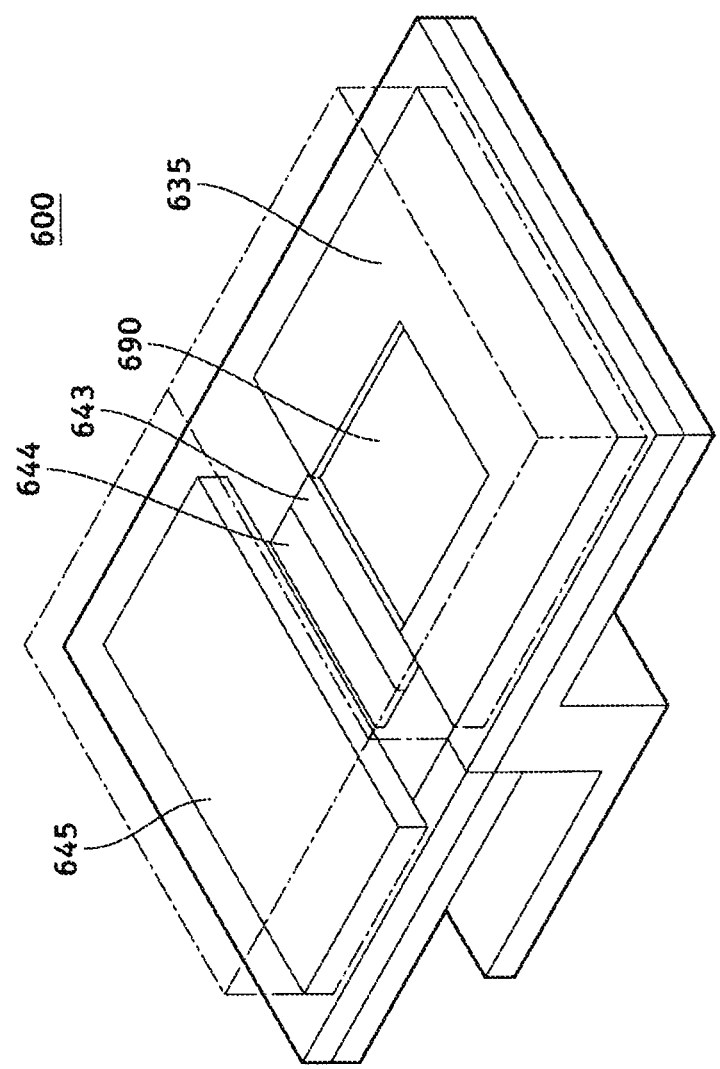
FIG. 6 shows an exemplary focal plan package according to an embodiment of the present disclosure.

FIG. 6 shows an exemplary focal plane package (600) according to an embodiment of the present disclosure. Focal plane package (600) includes first PWA (635), second PWA (645), second ROIC (644), thermopiles (634) and element (690) which represent an integrated version of HOT BIRD and first ROIC. All the elements shown have similar functionalities as their counter parts of FIGS. 1C-1D.

Medium-Wave Infrared Performance

The radiant power, or radiant flux, measured in watts (W), reaching BIRD is expressed as follows $$\Phi = \tau_{atm} \tau_{ZnSe} \eta_o \eta_g L_s A_i \Omega_{fsd}/n^2 \quad (1)$$

where
$\tau_{atm}$—the atmosphere transmission,
$T_{ZnSe}$—the transmission of the ZnSe window,
$\eta_o$—the efficiency of all the reflective optics, the splitting efficiency of the grating considered,
$\eta_g$=the efficiency grating
$L_s$—the radiance of the blackbody as the source,
$A_i$—the image area on the detector,
$\Omega_{fsd}$—the projected solid angle field stop subtends at the detector,
n—the refractive index of air.

All the items in Eq. (1) and the following equations except geometrical ones are spectral dependent. The labels for spectral subscript are omit for simplicity. The spectral radiance $L_s$ is defined by Planck's equation $$L_s = \frac{2hc^2}{\lambda^5} \frac{1}{\exp\left(\frac{hc}{\lambda k_B T}\right) - 1} \quad (2)$$

where c is the speed of light in vacuum, $k_B$ the Boltzmann constant, h the Planck constant. The projected solid angle $\Omega_{fsd}$ is calculated using the following equation, $$\Omega_{fsd} = \frac{\pi}{4(f/\#)^2} \quad (3)$$

The image area on the detector $A_i$ is determined by $A_s/m^2$, where $A_s$ and m are the source area and magnification, respectively. The source area is defined by the pinhole size located in front of the blackbody. The number of photons reaching BIRD can be calculated based on the power in Eq. (1) as follows $$N = \frac{\Phi t_{int}}{hc/\lambda} \quad (4)$$

where $t_{int}$ is the integration time, and $hc/\lambda$ the photon energy. Then the signal output from BIRD due to N photons in term of electron number is $$S = QN \quad (5)$$

where Q is quantum efficiency. The noise in term of electron number is show as $$n_{tot} = \sqrt{(n_{read})^2 + (n_{dark})^2 + (n_{digit})^2 + (n_{photon})^2} \quad (6)$$

where $n_{read}$ is read noise, $n_{dark}$ dark current noise, $n_{digit}$ digitization noise, and $n_{photon} = \sqrt{QN}$ is the noise in photo-generated signal, or photon short-noise.

By combing Eqs. (5) and (6), we get the SNR as $$SNR = \frac{S}{n_{tot}} = \frac{QN}{\sqrt{(n_{read})^2 + (n_{dark})^2 + (n_{digit})^2 + (\sqrt{QN})^2}} \quad (7)$$

The noise-equivalent delta temperature (NEDT), the change in temperature that yields a SNR ratio of unity, is $$NEDT = \frac{\sigma_{temporal} \Box \Delta T}{\text{Mean}(T_H) - \text{Mean}(T_L)}$$

$$\sigma_{temporal} = \sum_{n=1}^{n=N} \sqrt{\frac{(\text{average}_{ij} - \text{data}_{ij})^2}{N}}$$

Long-Wave Infrared Performance

Equations (1)-(3) above also applies in this case. In order to obtain thermopile specific response, equations (1)-(3) in [18] may be applied.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

LIST OF REFERENCES

[1] M. C. De Sanctis, A. Coradini, E. Ammannito, G. Filacchione, M. T. Capria, S. Fonte, G. Magni, A. Barbis, A. Bini, M. Dami, I. Ficai-Veltroni, G. Preti, and VIR Team, "The VIR Spectrometer," Space Sci. Rev. 163(1), 329-369 (2011).

[2] T. Okada, T. Fukuhara, S. Tanaka, M. Taguchi, T. Imamura, T. Arai, H. Senshu, Y. Ogawa, H. Demura, K. Kitazato, R. Nakamura, T. Kouyama, T. Sekiguchi, S. Hasegawa, T. Matsunaga, T. Wada, J. Takita, N. Sakatani, Y. Horikawa, K. Endo, J. Helbert, T. G. Müller, and A. Hagermann, "Thermal Infrared Imaging Experiments of C-Type Asteroid 162173 Ryugu on Hayabusa2," Space Sci. Rev. 208(1), 255-286 (2017)

[3] P. R. Christensen, V. E. Hamilton, G. L. Mehall, D. Pelham, W. O'Donnell, S. Anwar, H. Bowles, S. Chase, J. Fahlgren, Z. Farkas, T. Fisher, O. James, I. Kubik, I. Lazbin, M. Miner, M. Rassas, L. Schulze, K. Shamordola, T. Tourville, G. West, R. Woodward, and D. Lauretta, "The OSIRIS-REx Thermal Emission Spectrometer (OTES) Instrument," Space Sci. Rev. 214(5), 87 (2018)

[4] E. B. Johnson, C. Hardgrove, R. Starr, S. Vogel, R. Frank, G. Stoddard, S. West, and J. Christian, "Development of the LunaH-Map miniature neutron spectrometer," Proc SPIE 10392, 103920H (2017)

[5] D. Daou, "Small innovative missions for planetary exploration," in European Planetary Science Congress 2017 (Abstract #EPSC2017-146, 2007)

[6] P. Voosen, "NASA to pay private space companies for moon rides," Science 362(6417), 875-876 (2018)

[7] P. Mouroulis, R. O. Green, and D. W. Wilson, "Optical design of a coastal ocean imaging spectrometer," Opt. Express 16(12), 9087 (2008)

[8] D. Takir and J. P. Emery, "Outer Main Belt asteroids: Identification and distribution of four 3-μm spectral groups," Icarus 219(2), 641-654 (2012)

[9] C. M. Pieters, J. N. Goswami, R. N. Clark, M. Annadurai, J. Boardman, B. Buratti, J.-P. Combe, M. D. Dyar, R. Green, J. W. Head, C. Hibbitts, M. Hicks, P. Isaacson, R. Klima, G. Kramer, S. Kumar, E. Livo, S. Lundeen, E. Malaret, T. McCord, J. Mustard, J. Nettles, N. Petro, C. Runyon, M. Staid, J. Sunshine, L. A. Taylor, S. Tompkins, and P. Varanasi, "Character and spatial distribution of $OH/H_2O$ on the surface of the Moon seen by M3 on Chandrayaan-1," Science 326(5952), 568-572 (2009)

[10] C. K. Materese, D. P. Cruikshank, S. A. Sandford, H. Imanaka, and M. Nuevo, "Ice chemistry on outer solar system bodies: electron radiolysis of $N_2$-, $CH_4$-, and CO-containing ices," Astrophys. J. 812(2), 150 (2015)

[11] M. M. McAdam, J. M. Sunshine, K. T. Howard, and T. M. McCoy, "Aqueous alteration on asteroids: Linking the mineralogy and spectroscopy of CM and CI chondrites," Icarus 245, 320-332 (2015)

[12] T. D. Glotch, P. G. Lucey, J. L. Bandfield, B. T. Greenhagen, I. R. Thomas, R. C. Elphic, N. Bowles, M. B. Wyatt, C. C. Allen, K. D. Hanna, and D. A. Paige, "Highly Silicic Compositions on the Moon," Science 329(5998), 1510-1513 (2010)

[13] A. D. Rogers, N. H. Warner, M. P. Golombek, J. W. Head, and J. C. Cowart, "Areally Extensive Surface Bedrock Exposures on Mars: Many Are Clastic Rocks, Not Lavas," Geophys. Res. Lett. 45(4), 1767-1777 (2018)

[14] D. W. Wilson, P. D. Maker, R. E. Muller, P. Z. Mouroulis, and J. Backlund, "Recent advances in blazed grating fabrication by electron-beam lithography," Proc. SPIE 5173, 51730E (2003)

[15] D. Z.-Y. Ting, C. J. Hill, A. Soibel, S. A. Keo, J. M. Mumolo, J. Nguyen, and S. D. Gunapala, "A high-performance long wavelength superlattice complementary barrier infrared detector," Appl. Phys. Lett. 95(2), 023508 (2009)

[16] D. Z.-Y. Ting, A. Soibel, A. Khoshakhlagh, J. Nguyen, L. Höglund, S. A. Keo, J. M. Mumolo, and S. D. Gunapala, "Exclusion, extraction, and junction placement effects in the complementary barrier infrared detector," Appl. Phys. Lett. 102(12), 121109 (2013)

[17] A. Soibel, D. Z. Ting, C. J. Hill, A. M. Fisher, L. Hoglund, Sam. A. Keo, and S. D. Gunapala, "Midwavelength infrared InAsSb/InSb nBn detector with extended cut-off wavelength," Appl. Phys. Lett. 109(10), 103505 (2016)

[18] M. C. Foote, E. W. Jones, and T. Caillat, "Uncooled thermopile infrared detector linear arrays with detectivity greater than 10/sup 9/cmHz/sup 1/2//W," in IEEE Transactions on Electron Devices (IEEE, 1998), 45, pp. 1896-1902

[19] M. C. Foote, M. Kenyon, T. R. Krueger, T. A. McCann, R. Chacon, E. W. Jones, M. R. Dickie, J. T. Schofield, D. J. McCleese, S. Gaalema, and W. Hu, "Thermopile detector arrays for space science applications," in *International Workshop on Thermal Detectors for Space Based Planetary, Solar, and Earth Science Applications* (TDW, 2003), p. 5

[20] M. C. Foote and E. W. Jones, "High-performance micromachined thermopile linear arrays," Proc. SPIE 3379, 192-197 (1998)

[21] G. Mariani and M. Kenyon, "Room-temperature remote sensing: Far-infrared imaging based on thermopile technology," in 2015 *40th International Conference on Infrared, Millimeter, and Terahertz Waves (IRMMW-THz)* (2015), pp. 1-2

[22] A. Offner, "Unit power imaging catoptric anastigmat," U.S. Pat. No. 3,748,015 (Jul. 24, 1973)

[23] P. Maker, R. Muller, D. Wilson, and P. Mouroulis, "New Convex Grating Types Manufactured by Electron Beam Lithography," in *Diffractive Optics and Micro-Optics* 10, OSA Technical Digest Series (1998), pp. 234-236

[24] P. Mouroulis, D. W. Wilson, P. D. Maker, and R. E. Muller, "Convex grating types for concentric imaging spectrometers," Appl. Opt. 37(31), 7200-7208 (1998)

[25] P. D. Maker, R. E. Muller, and D. W. Wilson, "Diffractive optical elements on non-flat substrates using electron beam lithography," U.S. Pat. No. 6,480,333 B1 (Nov. 12, 2002)

[26] D. L. Johnson, M. J. Lysek, and J. M. Morookian, "The Ricor K508 cryocooler operational experience on Mars," AIP Conf. Proc. 1573(1), 1792-1799 (2014)

The invention claimed is:

1. A spectrometer comprising:
an optical assembly including a telescope, a grating and a relay system; and
a focal plane module including a first detector and a second detector,
wherein:
i) the optical assembly is configured to:
receive light from an object or scene through the telescope, thereby focusing the light, receive the focused light by the grating through the relay system; and
split the received light by the grating into a first beam within a first spectral range and a second beam within a second spectral range different from the first spectral range, and
ii) the focal plane module is configured to:
receive the first beam by the first detector to generate a first output signal in correspondence with a spectral content of the first beam, and
receive the second beam by the second detector to generate a second output signal in correspondence with a spectral content of the second beam;
iii) the relay system comprises a first relay with three mirrors, and
iv) the grating is disposed on a secondary mirror of the first relay.

2. The spectrometer of claim 1, wherein the relay system further comprises a second relay configured to focus the first beam and the second beam onto the focal plane module.

3. The spectrometer of claim 1, wherein the grating is a bi-faceted grating comprising two diffraction grating patterns on a mirror substrate with a different diffraction grating written on each facet of the mirror substrate.

4. The spectrometer of claim 1, wherein the first spectral range includes a mid-wave infrared spectral range and the second spectral range include a long-wave infrared spectral range, and wherein the mid-wave infrared spectral range includes wavelengths in a range of 2 μm to 4 μm, and the long-wave infrared spectral range includes wavelengths in a range of 5.5 μm to 12 μm.

5. The spectrometer of claim 1, further comprising a pinhole disposed between the telescope module and the relay system.

6. A spacecraft comprising the spectrometer of claim 1.

7. A spectrometer comprising:
an optical assembly including a telescope, a grating and a relay system; and
a focal plane module including a first detector and a second detector,
wherein:
i) the optical assembly is configured to:
receive light from an object or scene through the telescope, thereby focusing the light, receive the focused light by the grating through the relay system; and
split the received light by the grating into a first beam within a first spectral range and a second beam within a second spectral range different from the first spectral range, and
ii) the focal plane module is configured to:
receive the first beam by the first detector to generate a first output signal in correspondence with a spectral content of the first beam, and
receive the second beam by the second detector to generate a second output signal in correspondence with a spectral content of the second beam;
iii) the first detector comprises a high-operating-temperature barrier infrared detector and the second detector comprises a thermal detector, and
iv) the first spectral range includes a mid-wave infrared spectral range and the second spectral range include a long-wave infrared spectral range.

8. The spectrometer of claim 7, wherein the high-operating-temperature barrier infrared detector comprises a two-dimensional focal plan array, and wherein the thermal detector comprises a line array of micro-sized thermopile detectors.

9. The spectrometer of claim 7, wherein in operative conditions a temperature of the high-operating-temperature barrier infrared detector is maintained at a colder than ambient temperature and a temperature of the thermal detector is at ambient temperature.

10. The spectrometer of claim 9, further comprising a cryocooler including cryocooler electronics, the cryocooler being configured to maintain temperature of the high-operating-temperature barrier infrared detector at the colder than ambient temperature.

11. The spectrometer of claim 10, wherein:
the first detector further comprises a first readout integrated circuit (ROIC) coupled to the high-operating-temperature barrier infrared detector, a first printed wire assembly (PWA) and a cold plate;
the second detector further comprises a second ROIC coupled to the thermal detector, a second PWA and an ambient plate;
a combination of the high-operating-temperature barrier infrared detector and the first ROIC are disposed on the first PWA bonded to the cold plate; and
a combination of the thermal detector and the second ROIC are disposed on the second PWA bonded to the ambient plate.

12. The spectrometer of claim 11, wherein the first ROIC is configured to generate the first output signal and the second ROIC is configured to generate the second output signal.

13. The spectrometer of claim 12, further comprising payload electronics configured to control the cryocooler electronics and to receive the first and the second output signal for analysis and storage.

14. The spectrometer of claim 13, wherein each of the first detector and the second detector comprises filters to filter out unwanted light.

15. The spectrometer of claim 14, wherein the first detector comprises a cold shield configured to receive the first beam, and wherein the second detector comprises an ambient shield configured to receive the second beam.

16. A method of spectrometry comprising:
receiving light from an object or a scene;
focusing the light;
receiving the focused light by a grating through a relay system, the relay system including a first relay with three mirrors and the grating being disposed on a secondary mirror of the first relay;
splitting the focused light by the grating into a first beam within a first spectral range and a second beam within a second spectral range;
focusing the first beam on a first detector and the second beam on a second detector;
generating by the first detector a first output signal in correspondence with a spectral content of the first beam; and
generating by the second detector a second output signal in correspondence with a spectral content of the second beam.

17. The method of claim 16, wherein the first spectral range includes a mid-wave infrared spectral range and the second spectral range include a long-wave infrared spectral range.

18. The method of claim 16, further comprising maintaining the first detector at a cold temperature and the second detector at an ambient temperature.

* * * * *